(12) United States Patent
Offerman

(10) Patent No.: US 8,333,942 B1
(45) Date of Patent: Dec. 18, 2012

(54) EVAPORITE METHOD TO SEQUESTER CARBON DIOXIDE

(76) Inventor: John D. Offerman, Orono, MN (US)

(*) Notice: Subject to any disclaimer, the term of this patent is extended or adjusted under 35 U.S.C. 154(b) by 421 days.

(21) Appl. No.: 12/658,415

(22) Filed: Feb. 9, 2010

Related U.S. Application Data

(60) Provisional application No. 61/207,154, filed on Feb. 9, 2009.

(51) Int. Cl.
*C01D 7/00* (2006.01)
*C01B 31/22* (2006.01)

(52) U.S. Cl. ........................ 423/206.2; 23/314

(58) Field of Classification Search ............... 423/206.2; 23/314
See application file for complete search history.

(56) References Cited

U.S. PATENT DOCUMENTS

| | | |
|---|---|---|
| 7,608,439 B2 | 10/2009 | Offerman |
| 7,611,208 B2 * | 11/2009 | Day et al. .................. 299/4 |
| 2009/0321349 A1 | 12/2009 | Offerman |

OTHER PUBLICATIONS

Rau et al., "Enhanced carbonate dissolution: a means of sequestering waste CO2 as ocean bicarbonate," Energy Conversion and Management 40:1803-1813, 1999.*
Lackner, Klaus S., Carbonate Chemistry for Sequestering Fossil Carbon, Annual Review Energy Environment, 2002, 27:193-232.
Regan, D. L. and Ivancic N., Integrated Systems for Producing Biogas and Liquid Fuel from Algae, Biotechnology and Bioengineering 1984: 26:1265-1271.

* cited by examiner

*Primary Examiner* — Rosanne Kosson
(74) *Attorney, Agent, or Firm* — Hugh McTavish

(57) ABSTRACT

The invention uses evaporites, e.g., from dried prehistoric lake beds to sequester carbon. The invention provides a method of sequestering carbon comprising: (a) dissolving crude naturally formed evaporites in water to form dissolved evaporite cations and anions; (b) contacting aqueous dissolved carbonate or bicarbonate, formed by dissolving carbon dioxide in water, with the dissolved evaporite cations to form precipitated carbonate mineral; and (c) sequestering the precipitated carbonate or bicarbonate mineral.

11 Claims, No Drawings

EVAPORITE METHOD TO SEQUESTER CARBON DIOXIDE

This application claims priority under 35 U.S.C. §119(e) from U.S. provisional patent application 61/207,154, filed Feb. 9, 2009.

BACKGROUND

Finding methods to control carbon dioxide emissions from human activity has become more urgent as the signs of climate change from elevated greenhouse gas levels become more apparent. One of the best targets for $CO_2$ reduction is coal-fired power plats and other large, stationary $CO_2$ emitters.

The leading proposed method to sequester $CO_2$ is referred to as carbon capture and storage (CCS). It involves separating carbon dioxide from nitrogen in power plant stack gas, compressing the $CO_2$, and pumping it underground to be permanently stored in suitable geologic formations that prevent escape of the gas. But concerns have been raised about the cost of CCS and the amount of energy that must be consumed to separate and compress the $CO_2$ and pump the $CO_2$ underground.

New methods of sequestering carbon dioxide are needed.

SUMMARY

The invention provides a method of sequestering carbon comprising: (a) dissolving crude naturally formed evaporites in water to form dissolved evaporite cations and anions; (b) contacting aqueous dissolved carbonate or bicarbonate, formed by dissolving carbon dioxide in water, with the dissolved evaporite cations to form precipitated carbonate mineral; and (c) sequestering the precipitated carbonate or bicarbonate mineral.

Evaporites are water-soluble mineral sediments that result from the evaporation of bodies of surface water. Evaporites are considered sedimentary rocks. All bodies of water have dissolved salts. Evaporites form when a lake or sea enters an environment where the water input is exceeded by the rate of evaporation. When evaporation occurs the salt content of the remaining water increases. As the salt content increases it eventually exceeds the saturation point for certain salts, and the salts precipitate. The salts with the lowest solubility product precipitate first.

In some embodiments, the method of the invention involves pipelines to transfer gaseous exhaust from a power plant. The combustion exhaust gas can be transferred directly, or $CO_2$ can be separated from $N_2$ and optionally other gases, and the $CO_2$ transferred by pipeline to a natural evaporite site, typically a dry prehistoric lake bed. The $CO_2$-containing gas may be dissolved in water at the natural evaporite site to generate an aqueous solution containing carbonate or bicarbonate.

The aqueous carbonate or bicarbonate solution may be mixed with crude evaporite to dissolve evaporites, forming dissolved evaporite cations and anions. The cations, such as $Ca^{2+}$, $Mg^{2+}$, $Fe^{2+}$, or $Na^+$, complex and precipitate with carbonate or bicarbonate to form precipitated carbonate or bicarbonate minerals. Most of the precipitates of carbonate, such as $CaCO_3$ (limestone), $MgCO_3$ (dolomite), and $FeCO_3$, have very low solubilities in water and are very stable. They can be left in place in the dry lake bed and are expected to remain stable for thousands or millions of years.

The method has certain advantages over CCS. For one advantage, in the present method, it is not necessary to pressurize $CO_2$. It is only necessary to make a solution of $CO_2$ in water, where the $CO_2$ will react with water to form carbonate ($CO_3^{2-}$) and bicarbonate ($HCO_3^-$).

DETAILED DESCRIPTION

Evaporites form as lakes or seas evaporate, causing the salts in the body of water to gradually precipitate. The most insoluble salts precipitate first, including calcium, magnesium, and iron complexes with carbonate. Then more soluble salts precipitate, including $CaSO_4$, sodium chloride, and potassium and magnesium salts.

Among the more common evaporite minerals are calcite ($CaCO_3$), dolomite ($CaMg(CO_3)_2$), gypsum ($CaSO_4$—$H_2O$), anhydrite ($CaSO_4$), halite (NaCl), and potassium and magnesium salts. Iron salts are also found in evaporites.

Natural evaporite sites are found throughout the world. Dry lake beds are found in most parts of the word in arid regions, such as California, Utah, and Nevada in the American West, the Middle East, Central Asia, South America, Africa, and Australia. The Salton Sea in southern California and Great Salt Lake in Utah are examples of evaporating inland seas in process. Death Valley, Searles Lake, China Lake, El Mirage, Ivanapah Lake, Roach Lake, and Delemare Lake are dry basins of inland seas in the United States.

Evaporites contain complexes containing $Ca^{2+}$, $Mg^{2+}$, $Fe^{2+}$, $Na^+$, and $K^+$as cations, as well as other cations, and $CO_3^{2-}$, $SO_4^{2-}$, $NO_3^-$, $Cl^-$, and other anions. The complexes with carbonate tend to be more insoluble than other salts. And the complexes with divalent $Ca^{2+}$ and $Fe^{2+}$ are more insoluble generally than those with $Mg^{2+}$, which in turn are more insoluble than $K^+$ and $Na^+$ salts.

The method uses cheap and abundant minerals to sequester carbon in a solid state. Thus, unlike in CCS, sequestering the carbon does not require pressurizing $CO_2$ gas or storing the gas in an enclosure assumed to be gas-tight and remain gas tight for thousands or millions of years.

In the method described, $CO_2$ and water are added to crude naturally formed evaporites. The water is used to dissolve and hydrate the $CO_2$ to form carbonate and bicarbonate and to dissolve cations and anions of the evaporites. The dissolved carbonate or bicarbonate contact the dissolved evaporite cations to form precipitated carbonate or bicarbonate mineral.

When the ions of a slightly soluble salt are brought together in aqueous solution in sufficient concentration a precipitate forms:

$$Fe^{3+}+3OH^-\rightarrow Fe(OH)_3 \text{ (solid)}$$

When the product of the aqueous concentrations of the ions in mole/L (raised to the power of their stoichometry coefficients) exceeds the solubility product constant ($K_{sp}$), the precipitate forms. For $Fe(OH)_3$, the $K_{sp}$ is $3\times10^{-39}$.

$$K_{sp}=[Fe^{3+}][OH^-]^3=3\times10^{-39}.$$

The insolubility of carbonates is in the order of $FeCO_3 > CaCO_3 > MgCO_3$. But all three of those form precipitates readily. $Na_2CO_3$ and $NaHCO_3$ are more water soluble, but as the water evaporites these also form as precipitated carbonate or bicarbonate minerals. Importantly, salts with carbonate anion are less soluble than salts with any other common anion.

$CaCO_3$ is less soluble than $CaSO_4$, $Ca(NO_3)_2$, or $CaCl_2$.
$MgCO_3$ is less soluble than $MgSO_4$, $Mg(NO_3)_2$, or $MgCl_2$.
$FeCO_3$ is less soluble than $FeSO_4$, $Fe(NO_3)_2$, or $FeCl_2$.
$Na_2CO_3$ is less soluble than $Na_2SO_4$, $NaNO_3$, or NaCl.

Thus, carbonate and bicarbonate salts, whether with $Ca^{2+}$, $Mg^{2+}$, $Na^+$ or other cations found in evaporates, precipitate before salts with any other common anion found in evaporites. Hence, as water is added to dissolve evaporite minerals, the cations released from any non-carbonate evaporites will precipitate more readily with added carbonate or bicarbonate than they will with the anion with which they were originally complexed.

The $CO_2$ to be sequestered is typically $CO_2$ from a fossil fuel combustion exhaust gas. But the $CO_2$ could be from any source. For instance, it could be separated from the atmosphere. $CO_2$ can be separated from other gases in the atmosphere by known methods, including cooling to distill $CO_2$ from the atmosphere or pressure swing adsorption.

But more typically, the $CO_2$ is from fossil fuel combustion exhaust gas, e.g., from a coal-burning power plant. The $CO_2$ can be transported as gas to a natural evaporite site. The combustion exhaust gas can all be transported, or $CO_2$ can be separated from other gases in the combustion exhaust gas at the site of combustion, to avoid the energetic and financial cost of transporting the other gases, and then the purified $CO_2$ can be transported as a gas to a natural evaporite site. The purified $CO_2$ may still contain other gases provided at least some other gases are partially or completely removed from the mixture.

The gaseous carbon dioxide is preferably transported by pipeline.

Thus, in some embodiments, the carbon dioxide is formed by fossil fuel combustion and is transported as gaseous carbon dioxide by pipeline from the site of fossil fuel combustion to a natural evaporite site; the method comprising: dissolving the carbon dioxide in water at the natural evaporite site to form dissolved carbonate or bicarbonate and contacting the dissolved carbonate or bicarbonate with the dissolved evaporite cations to form precipitated carbonate or bicarbonate mineral.

Since evaporite sites are typically dry, it is ordinarily necessary to transport water to the natural evaporite site in the present invention. The volume of water needed, however, does not have to be particularly large, since only enough water is needed to dissolve the $CO_2$ and hydrate it to form dissolved carbonate or bicarbonate, and then to dissolve some of the evaporites.

In some embodiments, the fossil fuel combustion exhaust gas is contacted with water at the site of fossil fuel combustion to dissolve $CO_2$ in the water to form dissolved carbonate and bicarbonate. Dissolving fossil fuel combustion gas in water has the additional advantage that most pollutants, including $CO_2$ are more soluble in water than innocuous gases. For instance, carbon dioxide, sulfur dioxide, and nitrogen oxides are all rather soluble in water. In contrast, $N_2$ and $O_2$ are less soluble. Thus, passing fossil fuel combustion exhaust gas through water will tend to remove pollutants including $CO_2$ from the gas stream, while the gas that does not dissolve will contain less $CO_2$ or other pollutants.

The dissolved carbonate or bicarbonate can be transported as aqueous solution to the natural evaporite site. Since water is also needed in the methods of the invention for sequestering carbon, and water is scarce at most natural evaporite sites, water usually needs to be transported to the evaporite site. Since both water and $CO_2$ need to be transported, it can be advantageous to dissolve the $CO_2$ in water at the fossil fuel combustion plant and transport both together as an aqueous solution to the natural evaporite site.

Alternatively, the crude naturally formed evaporites or dissolved evaporite cations can be transported from the natural evaporite site to the fossil fuel combustion site. But, more typically, the $CO_2$ or aqueous carbonate or bicarbonate are transported to a natural evaporite site.

Thus, in particular embodiments, the aqueous dissolved carbonate or bicarbonate is formed by dissolving fossil fuel combustion exhaust gas in water at the site of fossil fuel combustion. The fossil fuel combustion exhaust gas can also be purified $CO_2$ from fossil fuel combustion exhaust gas. That is, the $CO_2$ could be purified from other gases before it is dissolved in water at the site of fossil fuel combustion.

In particular embodiments, the aqueous dissolved carbonate or bicarbonate is transported by pipeline from the site of fossil fuel combustion to a natural evaporite site to contact the dissolved evaporite cations at the natural evaporite site.

In particular embodiments the crude naturally formed evaporites originate in a natural evaporite site and the contacting step is executed at the natural evaporite site and the precipitated carbonate or bicarbonate mineral is sequestered in the natural evaporite site.

The evaporites are preferably crude naturally formed evaporites. The term "crude naturally formed evaporites" refers to evaporites that are in situ where formed or if removed from the site where they are formed are not chemically processed to purify certain evaporite minerals from other minerals.

But in other embodiments, evaporites that are processed to enrich the evaporites in more useful evaporite minerals, specifically those containing divalent or trivalent cations and anions other than carbonate or bicarbonate, may be used.

Preferably, the crude evaporites are used without processing, because this reduces the cost of the procedure. Also preferably, the evaporites are used in situ. That is, the evaporites do not need to be removed from the natural formations where they exist. The dissolved carbonate or bicarbonate and water can be added to the evaporites in situ in the natural evaporite site.

For instance, an aqueous solution containing dissolved carbonate or bicarbonate can simply be poured on the surface of a natural evaporite site. The solution will percolate into the surface, dissolve evaporite cations and anions, and the carbonate or bicarbonate will react with the evaporite cations to precipitate carbonate or bicarbonate mineral.

In another embodiment, channels can be drilled into the interior of a natural evaporite site, and an aqueous solution containing dissolved carbonate or bicarbonate can be added to the channels.

The sequestering step can be the same step as the contacting step that forms the precipitate. That is, the sequestering step can simply be leaving the precipitated carbonate or bicarbonate mineral where it forms, e.g., in situ in a natural evaporite site. In other embodiments, the sequestering step involves collecting the precipitated carbonate or bicarbonate mineral and placing it in a safe site, e.g., burying it in a natural evaporite site.

Thus, in particular embodiments of the method of sequestering carbon, the dissolving, contacting, and sequestering steps comprise or consist of adding an aqueous solution comprising dissolved carbonate or bicarbonate, formed by dissolving carbon dioxide in water, to in situ evaporites in a natural evaporite site.

In one embodiment of the step of adding the aqueous solution comprises pouring the aqueous solution on an upper surface of a natural evaporite site. In other embodiments, the step of adding the aqueous solution comprises adding the aqueous solution to channels drilled into the interior of a natural evaporite site.

Preferably the aqueous dissolved carbonate or bicarbonate is contacted with the evaporite cations in situ in a natural evaporite site. But the evaporite may be removed from its natural evaporite site. It is desirable in certain cases to crush the evaporites to increase their surface area and allow greater access of the evaporite to water to dissolve the evaporite. Thus, in a particular embodiment, the step of dissolving crude naturally formed evaporites in water comprises mining and crushing crude evaporites from a natural evaporite site, and adding water to the crushed crude evaporites.

In other embodiments, evaporite-comprising material from a natural evaporite site (e.g., dry prehistoric lake bed) is removed from the site and mixed with water to dissolve evaporite cations and anions. Insoluble material is added back to the natural evaporite site. The solubilized evaporite cations and anions are then contacted with dissolved carbonate or bicarbonate. This can be by dissolving gaseous $CO_2$ into the evaporite solution containing the solubilized evaporite cations and anions, or by mixing the evaporite solution with separate solution containing dissolved carbonate or bicarbonate, e.g., in a mixing pond.

It is also possible to first make the solution containing dissolved carbonate or bicarbonate and then use that aqueous solution to dissolve material removed from a natural evaporite site. In that case, as the evaporite cations dissolve, they contact the dissolved carbonate or bicarbonate and then quickly form precipitated carbonate or bicarbonate mineral.

The precipitated carbonate or bicarbonate mineral that is sequestered in any of the embodiments described herein can be any solid carbonate or bicarbonate, e.g., $CaCO_3$, $CaMg(CO_3)_2$, $FeCO_3$, $Na_2CO_3$, $NaHCO_3$, $K_2CO_3$, $KHCO_3$, $ZnCO_3$, $MnCO_3$, etc.

In one embodiment, a $CO_2$-containing gas is dissolved in a series of bodies of water, producing a lower carbonate and bicarbonate concentration in each successive body of water. The gas is dissolved, for instance, in a first pond. The gas space above the first pond is then sparged into a second pond. The head space gas over the second pond then may be sparged into a third successive pond. Much of the $CO_2$ in the gas dissolves in the first pond. Thus, the $CO_2$ concentration in the head-space gas of the first pond sparged into the second pond is lower than the $CO_2$ concentration of the starting gas sparged into the first pond. Likewise the $CO_2$ concentration of the gas sparged into a third successive pond would be lower still. Since the $CO_2$ concentration of the gas decreases with each successive pond, the dissolved $CO_2$ and dissolved carbonic acid, carbonate and bicarbonate concentrations are also lower in each successive pond than in the previous pond. Evaporites or dissolved evaporite cations may be added to each pond to precipitate the carbonate and bicarbonate. Since the carbonate and bicarbonate concentration are lower in each successive pond, in one embodiment more evaporite cation is added to the first pond than the second and more to the second than the third, and so on if additional ponds or bodies of water are used. In this embodiment with multiple bodies of water, each body of water should be covered to capture the gas in the head space so the gas can be captured to be transferred to the next body of water.

Thus, one embodiment of the invention comprises: (a) dissolving a carbon dioxide-containing gas in a first body of water to produce dissolved carbonate or bicarbonate in the first body of water and a first head-space gas in contact with the first body of water; (b) collecting the first head-space gas and dissolving the first head space gas in a second body of water to produce dissolved carbonate or bicarbonate in the second body of water and a second head space gas; (c) contacting dissolved carbonate or bicarbonate from the first and second bodies of water with the dissolved evaporite cations to form the precipitated carbonate or bicarbonate mineral.

In other embodiments of the invention, the method of sequestering carbon can include other steps to utilize $CO_2$ in addition to hydrating the $CO_2$ to aqueous dissolved carbonate or bicarbonate and contacting the dissolved carbonate or bicarbonate with dissolved evaporite cations to form precipitated carbonate or bicarbonate minerals. Specifically, $CO_2$ can be used to stimulate photosynthetic growth of algae or other aquatic plants, and $CO_2$ can be reduced to methane in anaerobic fermentation with a reduced substrate—either $H_2$ or a reduced organic substrate. These are described in U.S. patent application Ser. No. 11/821,935, U.S. provisional patent application Ser. No. 61/133,198, and U.S. patent application Ser. No. 12/459,136, all three of which are incorporated by reference.

Thus, in particular embodiments, the method further comprises feeding carbon dioxide from a fossil fuel combustion exhaust gas to aquatic plants in a photosynthetic aquatic medium exposed to light in a photosynthetic culture chamber. A portion of the carbon dioxide from the fossil fuel combustion exhaust gas can be fed to the aquatic plants and a portion separately dissolved in water and contacted with the dissolved evaporite. In other embodiments, the $CO_2$ is fed to the aquatic plants in the aquatic medium, and after harvesting the aquatic plants, the aquatic medium, containing dissolved carbonate and bicarbonate from the $CO_2$, is contacted with the dissolved evaporite cations. In other embodiments, the $CO_2$ is contacted with the aquatic medium to feed the photosynthetic aquatic plants, and the head-space gas above the photosynthetic medium, still high in CO2, is contacted with a second body of water to produce dissolved carbonate or bicarbonate in the second body of water, and dissolved carbonate or bicarbonate from th second body of water is contacted with the dissolved evaporite cations to form the precipitated carbonate or bicarbonate mineral.

If algae or other aquatic plants have adequate nutrients such as nitrogen and phosphorous, and adequate light, the limiting factor in photosynthetic productivity is $CO_2$. Providing additional $CO_2$ to the aquatic medium of the photosynthetic culture chamber can greatly enhance photosynthetic yield. Regan et al. (Regan, D. L. and Ivancic N., *Biotechnology and Bioengineering* 26:1265-1271 (1984)) reported that when mixed microalgae cultures grown in medium enriched with nitrogen and phosphorous were sparged with 1% $CO_2$, productivity of the cultures increased more than 4-fold over cultures grown in enriched medium without $CO_2$ sparging.

Thus, in some embodiments, the aqueous dissolved carbonate or bicarbonate contacted with the dissolved evaporite cations comprises the photosynthetic aquatic medium.

Since natural evaporite sites are typically warm sunny places, they can be productive places to cultivate algae or other aquatic plants for energy.

Many algae produce large amounts of oil that is suitable for processing to diesel. And algae or other aquatic plants, like any other organic material, can be digested in an anaerobic digester by fermentative microorganisms to biogas comprising methane and $CO_2$. The methane can be used directly as fuel, or can be processed by Fischer-Tropsch processes to longer chain carbons, including diesel fuel and alcohols.

Carbon as carbon dioxide or bicarbonate is a limiting factor for photosynthetic growth if light and mineral nutrients are in adequate supply. Thus, feeding carbon dioxide to aquatic plants in a photosynthetic aquatic medium promotes photosynthetic growth of the aquatic plants. The photosynthetic growth converts the $CO_2$ to biomass, which prevents the $CO_2$, at least temporarily, from being added to the atmosphere to feed the greenhouse effect.

Carbon dioxide is also limiting in anaerobic microbial methanogenesis. In anaerobic fermentation to produce biogas comprising methane and $CO_2$, methane is produced from acetic acid by some methanogenic microbes and produced from hydrogen and carbon dioxide by the reaction of $4H_2+CO_2 \rightarrow CH_4+2H_2O$ by other methanogens. The $H_2$ for reducing $CO_2$ arises in nature from fermentation of reduced carbon compounds. Since $CO_2$ is a substrate in the latter reaction, $CO_2$ is often a limiting substrate for methanogenesis. Thus, the rate of methane production can be increased by adding $CO_2$ to the anaerobic digester.

Thus, in other embodiments, the method of sequestering carbon includes: (a) collecting a fossil fuel combustion exhaust gas; (b) separating $O_2$ from $CO_2$ in the exhaust gas to generate a $CO_2$-rich anaerobic exhaust gas fraction; (c) feeding the $CO_2$-rich anaerobic exhaust gas fraction to a fermentation mixture containing methanogenic microorganisms; (d) feeding a reduced substrate selected from the group consisting of $H_2$ and organic material and a combination thereof to the fermentation mixture; and (e) producing a biogas comprising methane in the fermentation mixture by the anaerobic fermentation of methanogenic microorganisms.

The organic reduced substrate for methanogenesis in some embodiments can be aquatic plants grown photosynthetically in the photosynthetic medium that is fed carbon dioxide.

All patents, patent documents, and other references cited are incorporated by reference.

What is claimed is:

1. A method of sequestering carbon from carbon dioxide, comprising:
    a) dissolving crude naturally formed evaporites in water to form dissolved evaporite cations and anions; and
    b) contacting aqueous dissolved carbonate or bicarbonate, formed by dissolving carbon dioxide in water, with the dissolved evaporite cations to form precipitated carbonate or bicarbonate mineral thereby sequestering the carbon as a precipitated carbonate or bicarbonate mineral.

2. The method of claim 1 wherein the aqueous dissolved carbonate or bicarbonate is formed by dissolving $CO_2$ from fossil fuel combustion exhaust gas in water at the site of fossil fuel combustion.

3. The method of claim 2 wherein the aqueous dissolved carbonate or bicarbonate is transported by pipeline from the site of fossil fuel combustion to a natural evaporite site to contact the dissolved evaporite cations at the natural evaporite site.

4. The method of claim 1 wherein the crude naturally formed evaporites originate in a natural evaporite site and the contacting step is executed at the natural evaporite site and the precipitated carbonate or bicarbonate mineral is sequestered in the natural evaporite site.

5. The method of claim 1 wherein the carbon dioxide is formed by fossil fuel combustion and is transported as gaseous carbon dioxide by pipeline from the site of fossil fuel combustion to a natural evaporite site;
    the method comprising:
    dissolving the carbon dioxide in water at the natural evaporite site to form dissolved carbonate or bicarbonate and contacting the dissolved carbonate or bicarbonate with the dissolved evaporite cations to form precipitated carbonate or bicarbonate mineral.

6. The method of claim 1 wherein the dissolving, contacting, and sequestering steps comprise adding an aqueous solution comprising dissolved carbonate or bicarbonate, formed by dissolving carbon dioxide in water, to in situ evaporites in a natural evaporite site.

7. The method of claim 6 wherein the step of adding the aqueous solution comprises pouring the aqueous solution on an upper surface of a natural evaporite site.

8. The method of claim 6 wherein the step of adding the aqueous solution comprises adding the aqueous solution to channels drilled into the interior of a natural evaporite site.

9. The method of claim 1 wherein the step of dissolving crude naturally formed evaporites in water comprises mining and crushing crude evaporites from a natural evaporite site, and adding water to the crushed crude evaporites.

10. The method of claim 1, wherein the aqueous carbonate or bicarbonate solution is made by:
    a) dissolving a carbon dioxide-containing gas in a first body of water to produce dissolved carbonate or bicarbonate in the first body of water and a first head-space gas in contact with the first body of water;
    b) collecting the first head-space gas and dissolving the first head space gas in a second body of water to produce dissolved carbonate or bicarbonate in the second body of water and a second head space gas; and
    c) combining the first and second bodies of water.

11. The method of claim 1, wherein the source of the carbon dioxide is a fossil fuel combustion exhaust gas.

* * * * *